(12) United States Patent
Ishida

(10) Patent No.: US 8,517,475 B2
(45) Date of Patent: Aug. 27, 2013

(54) BRAKE APPARATUS

(75) Inventor: Satoshi Ishida, Chiryu (JP)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 123 days.

(21) Appl. No.: 13/183,995

(22) Filed: Jul. 15, 2011

(65) Prior Publication Data

US 2012/0013174 A1    Jan. 19, 2012

(30) Foreign Application Priority Data

Jul. 16, 2010 (JP) .................................. 2010-161762

(51) Int. Cl.
*B60T 8/44* (2006.01)

(52) U.S. Cl.
USPC ....................................... 303/114.1; 188/359

(58) Field of Classification Search
USPC ......... 188/348–359; 303/114.1; 60/545–589
See application file for complete search history.

(56) References Cited

U.S. PATENT DOCUMENTS

| | | | | | |
|---|---|---|---|---|---|
| 3,999,808 | A | * | 12/1976 | Belart | 303/122.13 |
| 5,246,281 | A | * | 9/1993 | Leppek | 303/114.1 |
| 6,705,682 | B2 | * | 3/2004 | Kusano et al. | 303/114.1 |
| 6,957,871 | B2 | * | 10/2005 | Maki | 303/114.1 |
| 7,331,641 | B2 | * | 2/2008 | Kusano | 303/114.1 |
| 2002/0140283 | A1 | * | 10/2002 | Kusano et al. | 303/114.1 |
| 2003/0030321 | A1 | * | 2/2003 | Kusano et al. | 303/114.1 |
| 2006/0158026 | A1 | * | 7/2006 | Aoki et al. | 303/114.1 |
| 2008/0258545 | A1 | * | 10/2008 | Drumm | 303/114.1 |

FOREIGN PATENT DOCUMENTS

| | | |
|---|---|---|
| JP | 2002-264795 A | 9/2002 |
| JP | 2007-055588 A | 3/2007 |
| JP | 2007-099057 A | 4/2007 |

OTHER PUBLICATIONS

Office Action (Notification of Reasons for Refusal) dated Jul. 10, 2012, issued by the Japanese Patent Office in corresponding Japanese Application No. 2010-161762, and an English translation of the Office Action. (6 pages).

* cited by examiner

*Primary Examiner* — Christopher Schwartz
(74) *Attorney, Agent, or Firm* — Buchanan Ingersoll & Rooney PC

(57) ABSTRACT

A brake apparatus includes: a master cylinder that forms a driving fluid pressure chamber, which drives master pistons as brake fluid is supplied and discharged; a pressure adjusting part adjusting a driving fluid pressure of the driving fluid pressure chamber; a reaction force generator that forms a reaction force chamber and that is configured to generate a reaction force fluid pressure in the reaction force chamber in accordance with an operating amount of the brake operation member; a brake fluid path, which connects the reaction force chamber to the driving fluid pressure chamber, and a valve device configured to block, at a current-on state, flowing of the brake fluid, and that communicates, at a current-off state, the reaction force chamber to the driving fluid pressure chamber through the brake fluid path to enable the flowing of the brake fluid.

4 Claims, 6 Drawing Sheets

BRAKE APPARATUS

BACKGROUND

The disclosure relates to a brake apparatus for performing regenerative coordination control of coordinating service brake and regenerative brake.

Generally, the regenerative coordination control has been performed to recover energy at the braking time, as regenerative energy. In the regenerative coordination control, when a driver steps a brake pedal, the regenerative brake is generated instead of the service brake. When performing the regenerative coordination control, an input piston is moved as the brake pedal is stepped. However, at this time, when the input piston is brought into contact with an output piston (which is an M/C piston provided to a master cylinder (hereinafter, referred to as M/C) and thus generates M/C pressure, braking force by the service brake is generated, so that regenerative efficiency is lowered.

In order to prevent the above, JP-2007-55588A discloses a braking apparatus for a vehicle in which a gap, which makes allowance for a stroke amount corresponding to a braking amount of the regenerative brake, is formed between the input piston and the output piston. In this case, by forming the gap between the input piston and the output piston, when performing the regenerative coordination control, the input piston does not contact the output piston until maximum regenerative brake, which can be generated, is generated, so that the regenerative efficiency can be maximized.

SUMMARY

However, when an electric system (for example, brake ECU) is out of order, the output piston should be directly pressed to generate braking force, so that the gap between the input piston and the output piston becomes an invalid stroke. Accordingly, the responsiveness is deteriorated when performing a braking operation, so that an amount of brake fluid, which is output from the M/C to a wheel cylinder (hereinafter, referred to as W/C), may be insufficient.

An aspect of the disclosure has been made to solve the above problem. An object of the aspect of the disclosure is to provide a brake apparatus capable of removing an invalid stroke while securing regenerative efficiency.

An aspect of the disclosure provides the following arrangement:

A brake apparatus comprising:

a master cylinder that forms a driving fluid pressure chamber, which drives master pistons as brake fluid is supplied thereto and discharged therefrom;

an electrically-operated pressure adjusting part configured to supply the brake fluid into the driving fluid pressure chamber or discharges the brake fluid in the driving fluid pressure chamber, thereby adjusting a driving fluid pressure of the driving fluid pressure chamber;

a reaction force generator that forms a reaction force chamber, which is compressed or expanded as a brake operation member is operated, and that is configured to generate a reaction force fluid pressure in the reaction force chamber in accordance with an operating amount of the brake operation member;

a brake fluid path, which connects the reaction force chamber to the driving fluid pressure chamber, and a valve device configured to block, at a current-on state, the brake fluid path between the reaction force chamber and the driving fluid pressure chamber to block flowing of the brake fluid, and that communicates, at a current-off state, the reaction force chamber to the driving fluid pressure chamber through the brake fluid path to enable the flowing of the brake fluid.

According to the above brake apparatus, when executing the regenerative coordination control at the normal state, the brake fluid path is closed by the valve device. Hence, the M/C pressure is not generated until maximum regenerative brake, which can be generated, is generated, so that it is possible to obtain the maximum regenerative efficiency. Also, when a power supply failure occurs, the brake fluid path becomes under communication state by the valve device. Hence, the brake fluid in the reaction force chamber is moved to the driving fluid pressure chamber through the brake fluid path, so that it is possible to generate the braking force in accordance with the operating amount of the brake operation member, without the invalid stroke. Accordingly, it is possible to remove the invalid stroke when the power supply failure occurs, while securing the regenerative efficiency.

DESCRIPTION OF EXEMPLARY EMBODIMENTS

Figure 1:
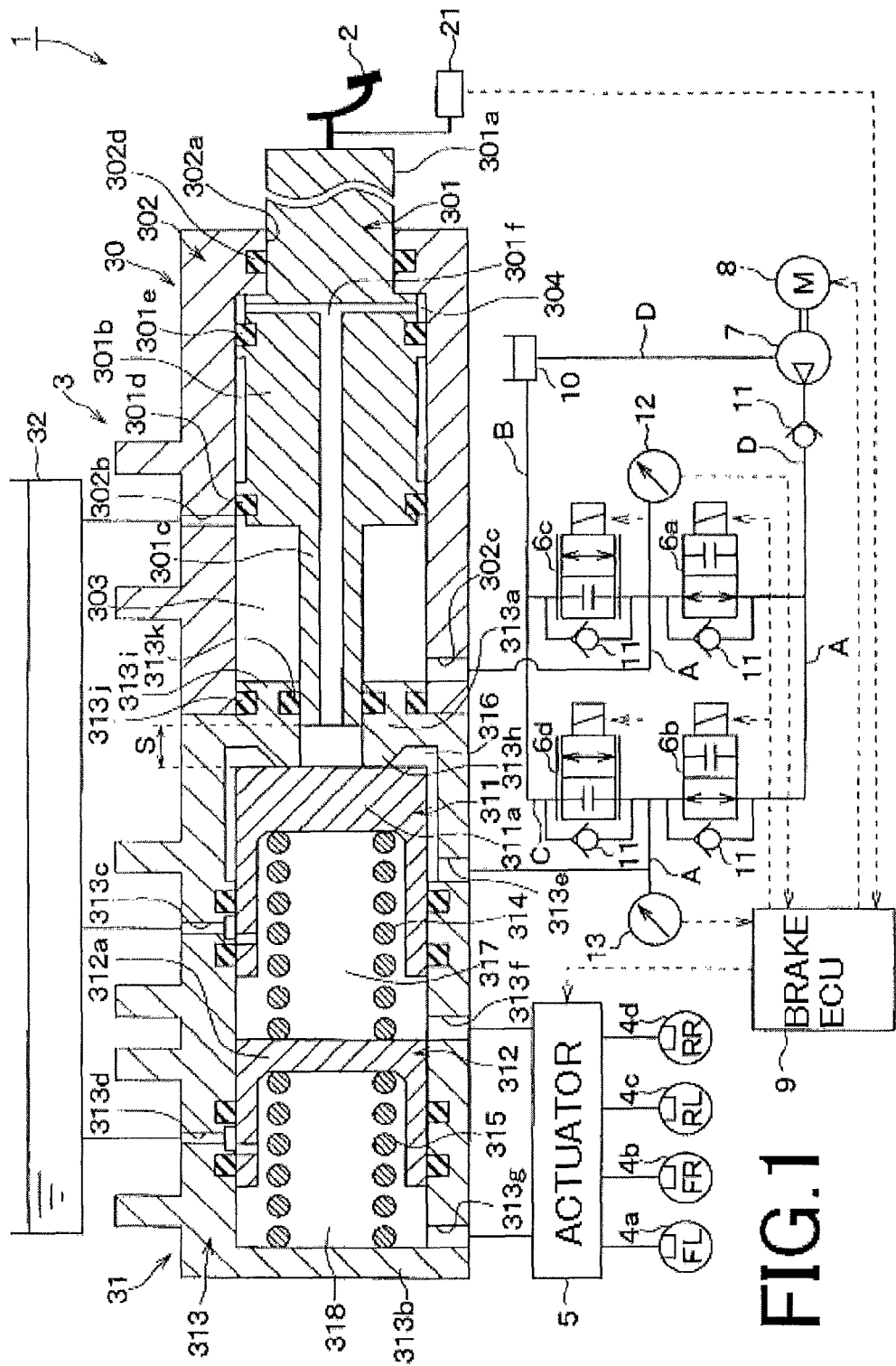
FIG. 1 is a circuit diagram showing an overall configuration of a brake apparatus 1 for a vehicle according to a first exemplary embodiment.

Hereinafter, the exemplary embodiments will be described with reference to the drawings. In the respective exemplary embodiments, the same or equivalent parts are indicated with the same reference numerals in the drawings.

First Exemplary Embodiment

A first exemplary embodiment is described. FIG. 1 shows an overall configuration of a brake apparatus 1 for a vehicle to which the first exemplary embodiment is applied. In the below, the brake apparatus 1 of this exemplary embodiment is described with reference to FIG. 1.

As shown in FIG. 1, the brake apparatus 1 has a brake pedal 2, an M/C 3, W/Cs 4a to 4d, an actuator 5 for brake fluid pressure control, first to fourth control valves 6a to 6d, a pump 7, a motor 8, a brake ECU 9 and the like.

The brake pedal 2 is stepped by a driver, thereby pressing an input piston 301 in the M/C 3. An operating amount of the brake pedal 2 is detected by an operation amount sensor 21. The operating amount sensor 21 is configured by a stroke sensor, a stepping-force sensor and the like. A detection signal of the operation amount sensor 21 is transmitted to the brake ECU 9, so that the brake ECU 9 can know the operating amount of the brake pedal 2. In the meantime, the brake pedal 2 is exemplified as a brake operation member in this exemplary embodiment. However, a brake lever and the like may be also applied.

The M/C 3 has an input part 30, an output part 31 and a master reservoir 32. The input part 30 is provided with the input piston 301 that is moved as the brake pedal 2 is stepped. The output part 31 is provided with M/C pistons 311, 312 corresponding to output pistons that are moved when generating service brake.

The input part 30 is provided with the input piston 301 that is pressed as the brake pedal 2 is stepped and a cylinder part 302 in which the input piston 301 slides and that forms a space for accommodating brake fluid.

The input piston 301 has a pressure bearing part 301a, a sliding part 301b and a pressing part 301c. The pressure bearing part 301a is a part to which the stepping force of the brake pedal 2 is input and is inserted into an opening 302a formed at one end of the cylinder part 302. The sliding part 301b has a diameter larger than the pressure bearing part 301a and has a size that is the same as or slightly smaller than an inner diameter of the cylinder part 302. The sliding part 301b is provided at its outer periphery with seal members 301d, 301e consisting of O rings and the like, so that the sliding part 301b and the cylinder part 302 are sealed therebetween. The pressing part 301c has a diameter smaller than the sliding part 301b and axially protrudes from the sliding part 301b toward the output part 31. A leading end of the pressing part 301c is spaced from the M/C piston 311 at a gap S.

In the pressing part 301c and the sliding part 301b, a communication passage 301f is formed which is connected from the leading end of the pressing part 301c to the brake pedal 2 side beyond the seal member 301e on the outer periphery of the sliding part 301b. By the communication passage 301f, the brake fluid in a space, which is formed between the leading end of the pressing part 301c and the M/C piston 311 by the gap S, is enabled to flow.

The cylinder part 302 secures the sealing between the outer periphery of the sliding part 301b and an inner wall surface of the cylinder part 302 by the seal members 301d, 301e and slidingly moves the input piston 301 in the axial direction. The cylinder part 302 is formed with the opening 302a into which the pressure bearing part 301a is inserted, a communication passage 302b for communicating with the master reservoir 32 under atmosphere and a communication passage 302c for communicating with a fluid pressure circuit configured by the control valves 6a to 6d, the pump 7 and the like. The opening 302a is provided on its inner wall surface with a seal member 302d, so that the opening 302a of the cylinder part 302 and the outer periphery of the pressure bearing part 301a are sealed therebetween.

By the above structure, the input part 30 is configured. With the input 30 configured as described above, the input piston 301 is disposed in the cylinder part 302, so that a reaction force chamber 303 is configured at the side of the output part 31 in the cylinder part 302, rather than the sliding part 301b. The reaction force chamber 303 is connected to the fluid pressure circuit configured by the control valves 6a to 6d, the pump 7 and the like through the communication passage 302c.

In addition, at the side facing the brake pedal 2 beyond the seal member 301e in the cylinder part 302, a rear chamber 304 is formed by the outer periphery of the sliding part 301b and a part facing the brake pedal 2 beyond the sliding part 301b. The rear chamber 304 communicates with the space between the leading end of the pressing part 301c and the M/C piston 311, which is formed by the gap S, through the communication passage 301f formed in the pressing part 301c and the sliding part 301b. As the input piston 301 is moved, volumes of the space between the leading end of the pressing part 301c and the M/C piston 311, which is formed by the gap S, and the rear chamber 304 are displaced. However, an area of a difference between the inner diameter of the cylinder part 302 and the outer diameter of the pressure bearing part 301a is the same as an area of the leading end of the pressing part 301c so that the displacements of the volumes are the same. Accordingly, even when the input piston 301 is moved in any direction of both axial directions in the cylinder part 302, the reaction force to the movement is not generated.

In the meantime, the communication passage 302b is disposed at a side more distant from the brake pedal 2 than the seal member 301d at a state before the brake pedal 2 is stepped. However, when the input piston 301 is moved as the brake pedal 2 is stepped, the communication passage 302b is immediately positioned to be closer to the brake pedal 2 than the seal member 301d. Accordingly, when the brake pedal 2 is stepped, the inside of the reaction force chamber 303 and the master reservoir 32 are closed, so that the brake fluid pressure in the reaction force chamber 303 is increased.

The output part 31 has M/C pistons 311, 312, a cylinder part 313 and return springs 314, 315.

The M/C pistons 311, 312 are coaxially disposed in the cylinder part 313 so that the M/C piston 311 serving as a primary piston is closer to the input piston 301 than the M/C piston 312 serving as a secondary piston. The M/C pistons 311, 312 are cylinder types having bottoms and are disposed in the cylinder part 313 so that bottom parts 311a, 312a thereof face the input piston 301. Thereby, a driving fluid pressure chamber 316 is configured between the bottom part of the M/C piston 311 and one end surface 313a of the cylinder part 313, a primary chamber 317 is configured between the M/C piston 311 and the M/C piston 312 and a secondary chamber 318 is configured between the M/C piston 312 and the other end of the cylinder part 313.

Since the cylinder part 313 has a hollow cylinder shape having both end surfaces 313a, 313b, it accommodates the M/C pistons 311, 312 in the hollow part thereof.

The cylinder part 313 has communication passages 313c to 313g in an outer peripheral wall thereof. When the M/C pistons 311, 312 are positioned at initial positions at which service brake is not generated, the communication passages 313c, 313d communicate the master reservoir 32 under atmosphere, the primary chamber 317 and the secondary chamber 318, respectively. When the M/C piston 311, 312 are moved from the initial positions, the communication passages 313c, 313d are closed by the outer peripheries of the M/C pistons 311, 312. The communication passage 313e communicate the fluid pressure circuit, which is configured by the control valves 6a to 6d, the pump 7 and the like, and the driving fluid pressure chamber 316. The communication passages 313f, 313g communicate the primary chamber 317, the secondary chamber 318 and a first piping system and a second piping system of the brake fluid pressure circuit.

In addition, an inner diameter of the cylinder part 313 is enlarged at the bottom part side of the M/C piston 311. Also, a protrusion 313h is provided which protrudes from one end surface 313a of the cylinder part 313 toward the M/C piston 311. By the protrusion, a gap is formed between the one end surface 313a of the cylinder part 313 and the bottom part of the M/C piston 311. By the enlarged inner diameter part of the cylinder part 311 and the gap between the one end surface 313a of the cylinder part 313 and the bottom part of the M/C piston 311, the driving fluid pressure chamber 316 is configured.

In the drawings, the cylinder part 311 is shown as if it were a single member. However, the cylinder part is configured by combining and integrating a plurality of members.

The return springs 314, 315 are respectively disposed between the M/C piston 311 and the M/C piston 312 and between the M/C piston 312 and the other end surface 313b of the cylinder part 313. When the M/C piston 312 is urged in the left direction of the drawing, the return springs 314, 315 generate the reaction force, and when the service brake is not generated, the return springs return the M/C pistons 311, 312 toward the input piston 301.

By the above structure, the output part 31 is configured. The leading end portions of the cylinder parts 302, 313 are connected, specifically, an insertion part 313i of the one end surface 313a of the cylinder part 313, which is opposite to the protrusion 313h, is fitted into the cylinder part 302, so that the input part 30 and the output part 31 are integrated to configure the M/C 3. In addition, the insertion part 313i is provided on its outer periphery side with a seal member 313j configured by an O ring and the like, so that the sealing with the cylinder part 302 is secured. Also, the insertion part 313i is provided on its inner periphery side with a seal member 313k configured by an O ring and the like, so that the sealing between the reaction force chamber 303 and the bottom part of the M/C piston 311 is secured.

The W/Cs 4a to 4d communicate with the primary chamber 317 and the secondary chamber 318 via the actuator 5 for brake fluid pressure control, respectively. For example, for front and rear pipes, the W/Cs 4a, 4b of the left and right front wheels FL, FR are connected to the primary chamber 317 via the first piping system and, the W/Cs 4c, 4d of the left and right rear wheels RL, RR are connected to the secondary chamber 318 via the second piping system. When the brake fluid pressure (M/C pressure) of the same pressure is generated to the primary chamber 317 and the secondary chamber 318 of the M/C 3, the generated brake fluid pressure is transported to the respective W/Cs 4a to 4d via the actuator 5 for brake fluid pressure control, so that the W/C pressure is generated and the braking force is thus generated to the respective wheels FL to RR.

The actuator 5 for brake fluid pressure control configures the brake fluid pressure circuit for adjusting the W/C pressure. Specifically, a plurality of pipes for controlling the brake fluid pressure is formed in a metal housing, a variety of electronic valves or pumps are connected to the pipes formed in the housing and a motor for pump driving is fixed to the housing, so that the actuator 5 for brake fluid pressure control configures the brake fluid pressure circuit between the M/C 3 and the W/Cs 4a to 4d. As the brake ECU 9 drives the various electronic valves or drives the motor to operate the pump, the actuator controls the brake fluid pressure in the brake fluid pressure circuit, thereby adjusting the W/C pressure. In addition, since the structure of the actuator 5 for brake fluid pressure control is well known, the detailed description thereof is omitted.

The first to fourth control valves 6a to 6d correspond to the valve device and are configured by two-position electromagnetic valves that are switched to a communication state and a closed state. The first and second control valves 6a, 6b are normally-opened types and the third and fourth control valves 6c, 6d are normally-closed types. The second and fourth control valves 6b, 6d correspond to the pressure adjusting control valves (first and second pressure adjusting control valves) and the first and third control valves 6a, 6c correspond to the reaction force control valves (first and second reaction force control valves). The pump 7 sucks and discharges the brake fluid, based on the driving of the motor 8. The first and third control valves 6a, 6c, the pump 7 and the motor 8 configure the reaction force generator that compresses or expands the reaction force chamber 303 in accordance with the operation of the brake pedal 2, thereby generating the reaction force fluid pressure in accordance with the operating amount of the brake pedal 2. In addition, the second and fourth control valves 6b, 6d, the pump 7 and the motor 8 configure the electrically-operated pressure adjusting part that supplies the brake fluid into the driving fluid pressure chamber 316 or discharges the brake fluid in the driving fluid pressure chamber 316, thereby adjusting the driving fluid pressure in the driving fluid pressure chamber 316.

Specifically, the first to fourth control valves 6a to 6d and the pump 7 configure the fluid pressure circuit that is provided between the reaction force chamber 303 of the input part 30 and the driving fluid pressure chamber 316 of the output part 31. The reaction force chamber 303 and the driving fluid pressure chamber 316 are connected therebetween by a pipe path A corresponding to the brake fluid path. The first and second control valves 6a, 6b of the normally-opened type are provided in the pipe path A. A pipe path B connects between the reaction force chamber 303 and the first control valve 6a in the pipe path A and between the reaction force chamber and the atmosphere reservoir 10. The third control valve 6c of the normally-closed type is provided in the pipe path B. A pipe path C connects between the driving fluid pressure chamber 316 and the second control valve 6b in the pipe path A. The fourth control valve 6d of the normally-closed type is provided in the pipe path C. A pipe path D connects between the atmosphere reservoir 10 and the first control valve 6a and second control valve 6b of the pipe path A. The pump 7 is provided in the pipe path D. A check valve 11 is provided in parallel with the respective control valves 6a to 6d and at a discharge port side of the pump 7, so that when closing the valves, the brake fluid does not flow from the driving fluid pressure chamber 316 to the reaction force chamber 303 or atmosphere reservoir 10 or high pressure is not applied to the discharge port of the pump 7.

In addition, a first pressure sensor 12 is provided at a part facing the reaction force chamber 303, rather than the first control valve 6a of the pipe path A, and a second pressure sensor 13 is provided at a part facing the driving fluid pressure chamber 316, rather than the second control valve 6b of the pipe path A. By the first and second pressure sensors 12, 13, the reaction force fluid pressure in the reaction force chamber 303 and the driving fluid pressure in the driving fluid pressure chamber 316 are monitored and detection signals thereof are input to the brake ECU 9. Based on the reaction force fluid pressure in the reaction force chamber 303 and the driving fluid pressure in the driving fluid pressure chamber 316, the brake ECU 9 controls the first to fourth control valves 6a to 6d and drives the motor 8 to operate the pump 7, thereby generating the reaction force to the stepping of the brake pedal 2 and adjusting the M/C pressure in the regenerative braking operation.

By the above, the brake apparatus 1 of this exemplary embodiment is configured. In the below, the operations of the brake apparatus 1 at normal and abnormal (power supply failure) states are described.

(1) Operation at Normal State

At the normal state, i.e., when the brake ECU 9 is not out of order and the control valves 6a to 6d, the motor 8 and the like can be thus normally driven, the operating amount of the brake pedal 2 is monitored and the brake pressure in the reaction force chamber 303 or driving fluid pressure chamber 316 is monitored, based on the detection signals of the operating sensor 21 and the first and second pressure sensors 12, 13.

In addition, the second control valve 6b is switched into the closed state and the motor 8 is driven to operate the pump 7.

Accordingly, the second control valve 6b is closed and the M/C pressure is not thus generated until the leading end of the pressing part 301c of the input piston 301 is brought into contact with the M/C piston 311 as the brake pedal 2 is stepped. In other words, when performing the regenerative coordination control, the input piston 301 does not contact the M/C piston 311, which is the output piston, until maximum regenerative brake, which can be generated, is generated, so that the regenerative efficiency can be maximized.

Also, since the first control valve 6a is under communication state, the brake fluid is introduced into the reaction force chamber 303 by the suction/discharge operations of the pump 7 and the reaction force fluid pressure in the reaction force chamber 303 is thus increased, so that the pedal reaction force is applied to the brake pedal 2 through the input piston 301. At this time, the brake fluid pressure in the reaction force chamber 303 is adjusted by the third control valve 6c so that the pedal reaction force can be generated in accordance with the operating amount of the brake pedal 2, based on the monitoring results of the operating amount sensor 21 and the first pressure sensor 12. In other words, by adjusting an amount of current to a solenoid of the third control valve 6c, a differential pressure between upstream and downstream of the third control valve 6c is controlled to be linear, so that it is possible to apply the pedal reaction force to the brake pedal 2 in accordance to the operating amount thereof.

After that, when the operating amount of the brake pedal 2 is increased and thus reaches the maximum amount that can be generated as the regenerative brake, the second control valve 6b becomes under communication state. Thereby, the brake fluid is introduced into the driving fluid pressure chamber 316 and the brake fluid pressure in the driving fluid pressure chamber 316 is thus increased, so that the M/C pistons 311, 312 are pressed in the left direction of the drawing and the M/C pressure is thus generated. At the same time, the fourth control valve 6d is operated and the brake fluid pressure in the driving fluid pressure chamber 316' is adjusted based on the monitoring results of the operating amount sensor 21 and the second pressure sensor 13. Thereby, it is possible to generate the braking force that corresponds to a result of subtracting the regenerative brake from the braking force generated in accordance with the operating amount of the brake pedal 2.

When the M/C pressure is generated as described above, it is transported to the respective W/Cs 4a to 4d through the actuator 5 for brake fluid pressure control. Thereby, it is possible to generate the desired braking force.

(2) Operation at Abnormal State

At the abnormal state, i.e., when the brake ECU 9 and the like is out of order and the control valves 6a to 6d, the motor 8 and the like cannot be thus normally driven, the first to fourth control valves 6a to 6d and the motor 8 cannot be operated. Accordingly, the first to fourth control valves 6a to 6d are positioned as shown.

When the brake pedal 5 is stepped at that state, the input piston 301 is moved in the left direction of the drawing, so that the brake fluid in the reaction force chamber 303 is moved into the driving fluid pressure chamber 316 through the pipe path A. In other words, since both the first and second control valves 6a, 6b become under communication state and both the third and fourth control valves 6c, 6d are closed, the brake fluid amount discharged from the reaction force chamber 303 is introduced into the driving fluid pressure chamber 316.

Thereby, the M/C pistons 311, 312 are pressed in the left direction of the drawing by the brake fluid pressure in the driving fluid pressure chamber 316, so that the M/C pressure is generated. When the M/C pressure is generated as described above, it is transported to the respective W/Cs 4a to 4d through the actuator 5 for brake fluid pressure control. Thereby, it is possible to generate the desired braking force. Accordingly, even at the abnormal state, the braking force can be generated from before the input piston 301 contacts the M/C piston 311 that is the output piston. Hence, even when the gap S is formed between the input piston 301 and the M/C piston 311, it is possible to remove the invalid stroke.

Figure 2:
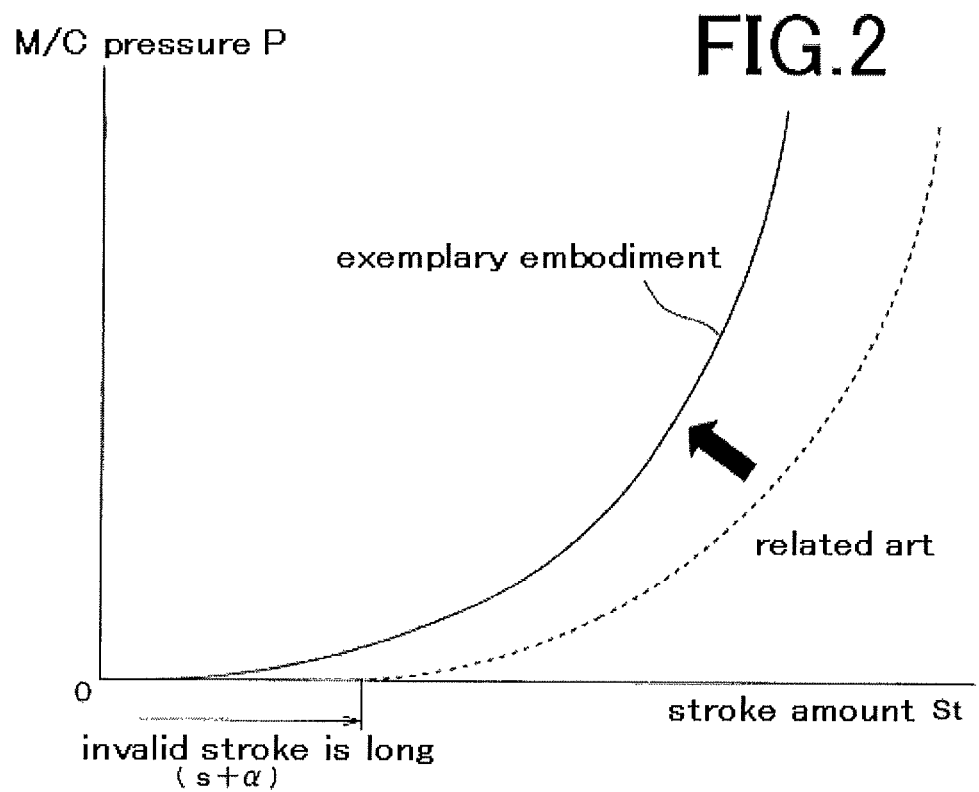
FIG. 2 shows a relation between a stroke amount and an M/C pressure.

For reference, the brake apparatus 1 of this exemplary embodiment and the brake apparatus of the related art were compared at the abnormal state. FIG. 2 shows relations between the stroke amounts and the M/C pressures of the brake apparatus 1 of this exemplary embodiment and the brake apparatus of the related art.

As shown, according to the related art, the M/C pressure cannot be generated until the stroke amount becomes the gap S or greater, so that the long invalid stroke is generated. However, according to the brake apparatus 1 of this exemplary embodiment, the M/C pressure can be generated from a state at which the stroke amount is approximate to zero. According to the brake apparatus 1 of this exemplary embodiment, it can be seen that it is possible to remove the invalid stroke.

As described above, the brake apparatus 1 of this exemplary embodiment has, in the M/C 3, the reaction force chamber 303 that changes the reaction force fluid pressure as the pressure piston 301 is moved and the driving fluid pressure chamber 316 that is connected to the reaction force chamber 303 via the fluid pressure circuit, and has the first to fourth control valves 6a to 6d and the pump 7 in the fluid pressure circuit, thereby configuring the reaction force generator that generates the reaction force fluid pressure in the reaction force chamber 303 and the electrically-operated pressure adjusting part that adjusts the driving fluid pressure in the driving fluid pressure chamber 316. The first and second control valves 6a, 6b are the normally-closed type electromagnetic valves that are closed when the current flows and are under communication state when the current does not flow.

Accordingly, when executing the regenerative coordination control at the normal state, the M/C pressure is not generated until the maximum regenerative brake, which can be generated, is generated, so that the regenerative efficiency can be maximized. In addition, since the second control valve 6b is under communication state at the abnormal state, the brake fluid in the reaction force chamber 303 is moved to the driving fluid pressure chamber 316 through the pipe path A, so that it is possible to generate the braking force without the invalid stroke. Accordingly, it is possible to remove the invalid stroke while securing the regenerative efficiency.

Second Exemplary Embodiment

A second exemplary embodiment is described. In this exemplary embodiment, the structure of the M/C 3 is changed regarding the first exemplary embodiment. Since the others are the same as the first exemplary embodiment, only the parts different from the first exemplary embodiment are described.

Figure 3:
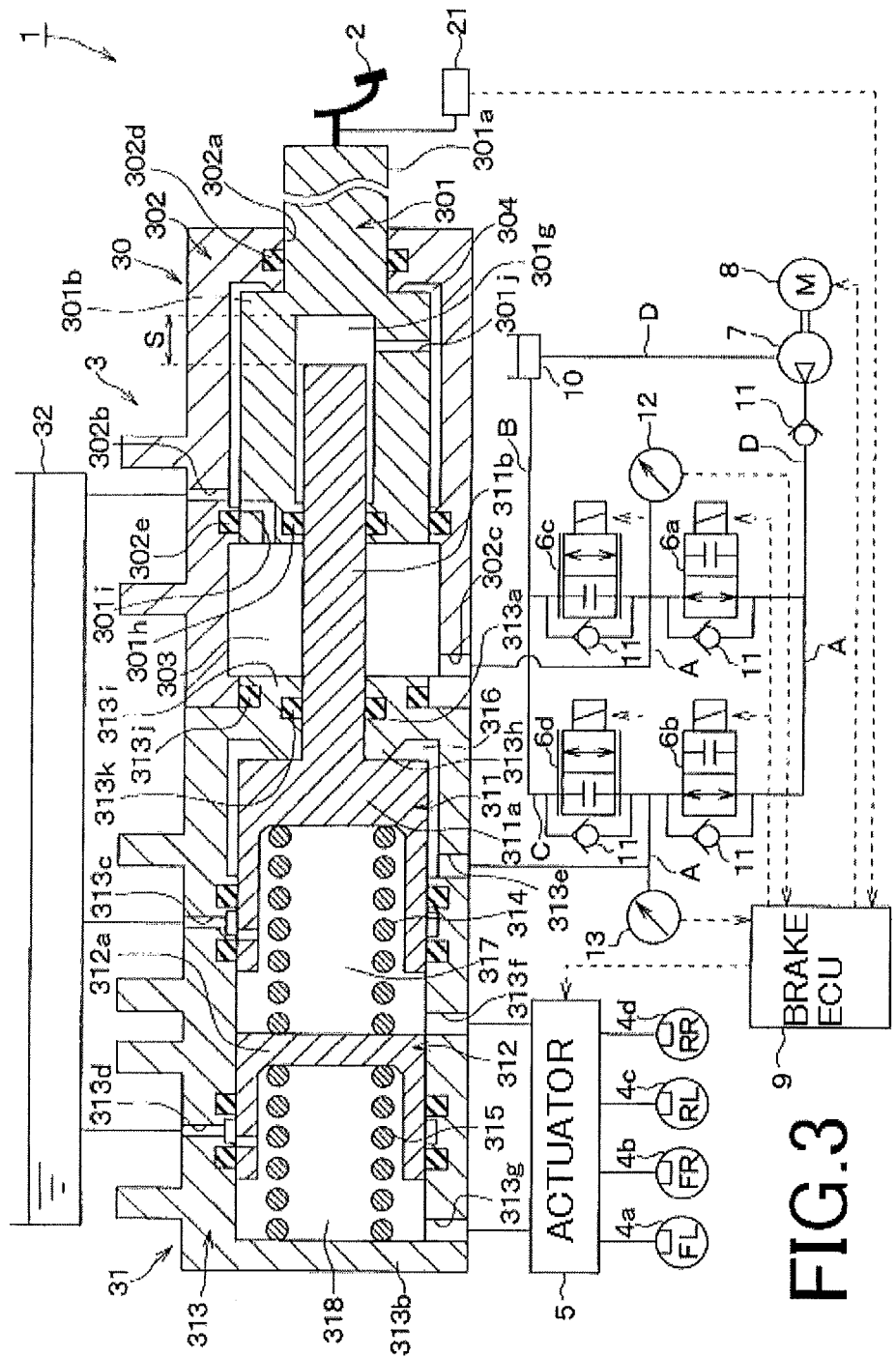
FIG. 3 is a circuit diagram showing an overall configuration of a brake apparatus 1 for a vehicle according to a second exemplary embodiment.

FIG. 3 shows an overall configuration of the brake apparatus 1 for a vehicle according to this exemplary embodiment. As shown in FIG. 3, in this exemplary embodiment, an input shaft 311b protruding toward the input piston 301 is provided at the bottom part of the M/C piston 311 and a hollow part 301g into which the input shaft 311b is inserted is formed at the input piston 301. The input shaft 311b is inserted from an entrance of the hollow part 301g and the gap S is formed between a bottom surface of the hollow part 301g and a leading end of the input shaft 311b. The entrance of the hollow part 301g is provided with a seal member 301h configured by an O ring and the like, so that the sealing between a space in the hollow part 301g and the reaction force chamber 303 is secured.

Accordingly, the input shaft 311b protruding in the axial direction of the input piston 301 is provided to the M/C piston 311 and the input piston 301 contacts the input shaft 311b, so that it is possible to provide the M/C piston 311 with a structure of generating the braking force by the service brake. The brake apparatus 1 having the above structure can also perform the same operation as the first exemplary embodiment and realize the same effects as the first exemplary embodiment.

Also, in this exemplary embodiment, a communication passage 301i is provided to the sliding part 301b and is connected to the communication passage 302b formed at the cylinder part 302 when the brake pedal 2 is not stepped, so that the reaction force chamber 303 and the master reservoir 32 are connected. In addition, a seal member 302e configured by an O ring and the like is provided to a left side of the communication passage 302b of the cylinder part 302. Accordingly, when the brake pedal 2 is stepped, the input piston 301 is moved in the left direction of the drawing, so that the communication passage 301i is disconnected from the communication passage 302b and the reaction force chamber 303 is blocked from the master reservoir 32. Accordingly, the communication passage 301i may be provided to the input piston 301. The above structure can be also applied to the first exemplary embodiment.

Also, the hollow part 301g and the rear chamber 304 are connected therebetween by a communication passage 301j provided to the sliding part 301b.

Third Exemplary Embodiment

A third exemplary embodiment is described. In this exemplary embodiment, an accumulator is provided to the first exemplary embodiment. Since the others are the same as the first exemplary embodiment, only the parts different from the first exemplary embodiment are described.

Figure 4:
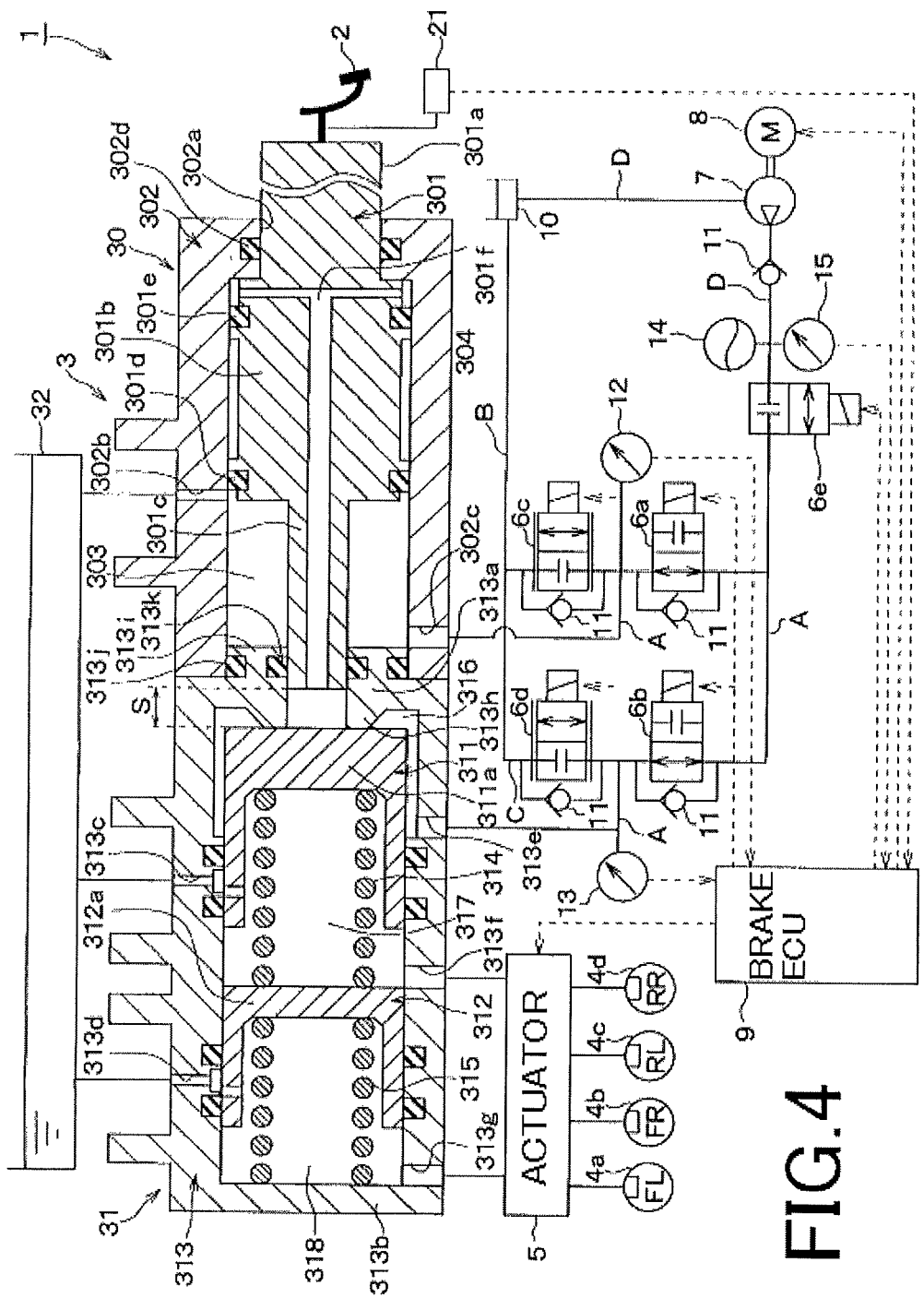
FIG. 4 is a circuit diagram showing an overall configuration of a brake apparatus 1 for a vehicle according to a third exemplary embodiment.

FIG. 4 shows an overall configuration of the brake apparatus 1 for a vehicle according to this exemplary embodiment. As shown in FIG. 4, an accumulator 14 that can accumulate the brake fluid, which is pneumatically transported by the discharge operation of the pump 7, is provided at the discharge side of the pump 7 on the pipe path D and at the pipe path A more closely than the check valve 11, and a fifth control valve 6e that is configured by a normally-closed type electromagnetic valve is provided at the pipe path A further more closely than the accumulator 14. In addition, the brake fluid pressure accumulated by the accumulator 14 (hereinafter, referred to as accumulator pressure) is detected by a third pressure sensor 15, and the brake ECU 9 drives the motor 8 when the accumulator pressure is below a threshold so that the accumulator pressure is always within a predetermined range, thereby enabling the pump 7 to perform the suction/discharge operations.

The brake apparatus 1 configured as described above basically performs the same operation as the first exemplary embodiment. However, at the normal state, the brake apparatus closes the second control valve 6b and opens the fifth control valve 6e. Thereby, it is possible to introduce the accumulator pressure into the reaction force chamber 303 while controlling the brake fluid in the high pressure accumulator 14 not to be introduced into the driving fluid pressure chamber 316. At this time, since the accumulator pressure that has been already under high pressure is introduced into the reaction force chamber 303, it is possible to generate the reaction force fluid pressure with good responsiveness.

Accordingly, the accumulator 14 and the fifth control valve 6e are provided, so that it is possible to generate the reaction force fluid pressure with better responsiveness.

Fourth Exemplary Embodiment

A fourth exemplary embodiment is described. In this exemplary embodiment, an accumulator is provided to the first exemplary embodiment and the configuration of the control valves 6a to 6d are changed. Since the others are the same as the first exemplary embodiment, only the parts different from the first exemplary embodiment are described.

Figure 5:
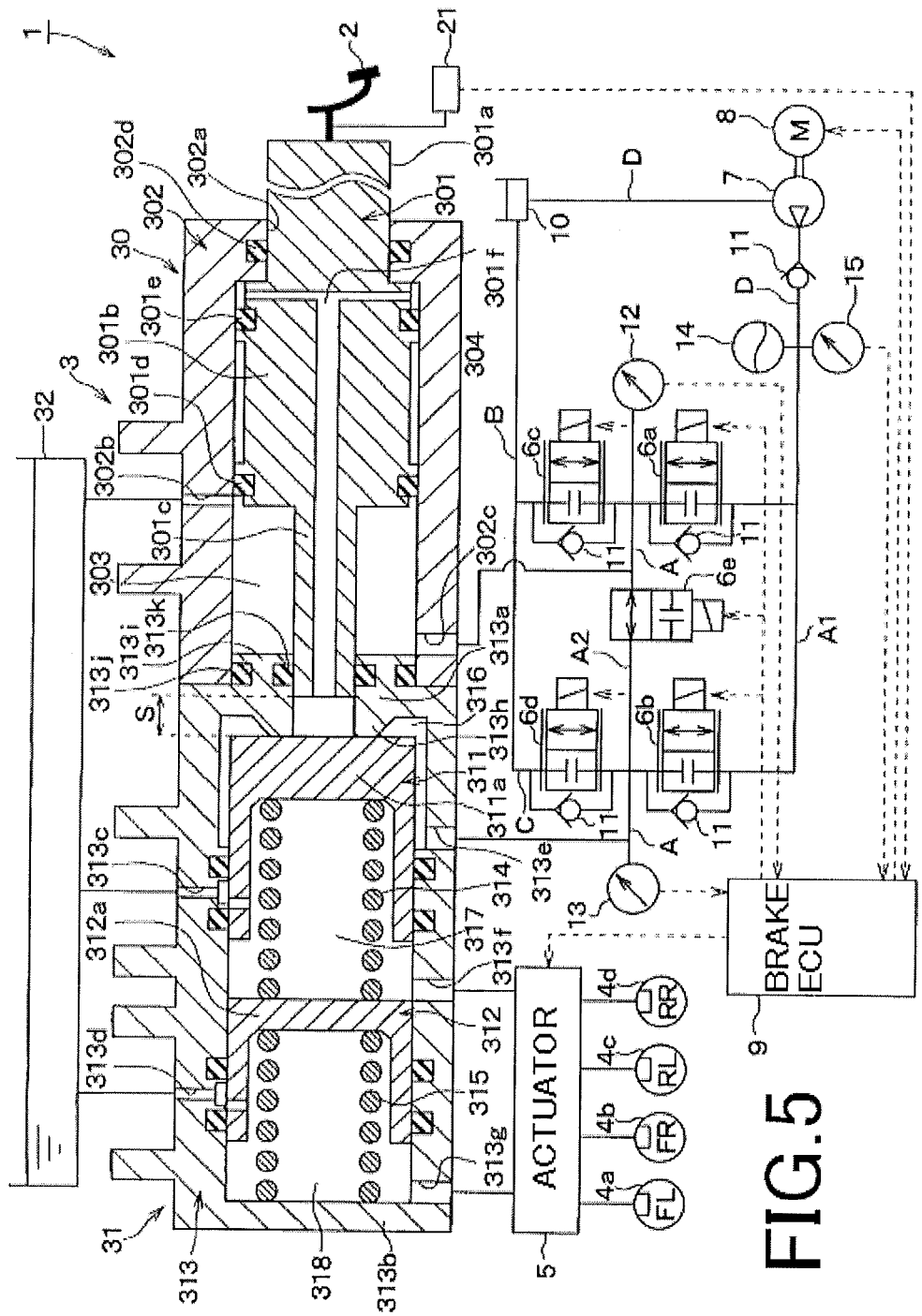
FIG. 5 is a circuit diagram showing an overall configuration of a brake apparatus 1 for a vehicle according to a fourth exemplary embodiment.

FIG. 5 shows an overall configuration of the brake apparatus 1 for a vehicle according to this exemplary embodiment. As shown in FIG. 5, also in this exemplary embodiment, the accumulator 14 and the third pressure sensor 15 are provided, like the third exemplary embodiment. The brake ECU 9 drives the motor 8 when the accumulator pressure is below a threshold so that the accumulator pressure is always within a predetermined range, thereby enabling the pump 7 to perform the suction/discharge operations.

In this exemplary embodiment, the accumulator pressure is kept by the first and second control valves 6a, 6b. In this exemplary embodiment, the first and second control valves 6a, 6b are normally-closed type differential pressure control valves and the first and second control valves 6a, 6b are basically closed to secure the accumulator pressure. In addition, regarding the pipe path A connecting the reaction force chamber 303 and the driving fluid pressure chamber 316, a pipe path A1 passing to the first and second control valves 6a, 6b and a pipe path A2 connecting the reaction force chamber 303 and the first control valve 6a therebetween and the driving fluid pressure chamber 316 and the second control valve 6b therebetween are provided and the fifth control valve 6e is provided on the pipe path A2.

According to the brake apparatus 1 having the above configuration, the fifth control valve 6e is switched into the closed state, so that even when the input piston 301 is moved as the brake pedal 2 is stepped, the M/C pistons 311, 312 are not moved. At the same time, the first control valve 6a is switched into a differential pressure state by applying the current, so that a differential pressure is generated between the upstream and downstream of the first control valve 6a. Thereby, it is possible to generate the reaction force fluid pressure in the reaction force chamber 303. At this time, when the differential pressure between the upstream and downstream of the first control valve 6a is controlled to be linear by adjusting an amount of current to a solenoid of the first control valve 6a, it is possible to apply the pedal reaction force to the brake pedal 2 in accordance to the operating amount thereof. Also, at the same time, when the differential pressure between the upstream and downstream of the third control valve 6c is controlled to be linear by switching the third control valve 6c into a differential pressure state and thus adjusting an amount of current to a solenoid of the third control valve 6c, it is possible to apply the pedal reaction force to the brake pedal 2 more finely, in accordance to the operating amount.

After that, when the operating amount of the brake pedal 2 is increased and thus reaches the maximum amount that can be generated as the regenerative brake, the second control valve 6b becomes under differential pressure state. Thereby, the brake fluid is introduced into the driving fluid pressure chamber 316 and the brake fluid pressure is thus generated in the driving fluid pressure chamber 316. At this time, when the differential pressure between the upstream and downstream of the second control valve 6b is controlled to be linear by adjusting an amount of current to a solenoid of the second control valve 6b, it is possible to generate the braking force that corresponds to a result of subtracting the regenerative brake from the braking force generated in accordance with the operating amount of the brake pedal 2. Also, at the same time, when the differential pressure between the upstream and downstream of the fourth control valve 6d is controlled to be linear by switching the fourth control valve 6d into a differential pressure state and thus adjusting an amount of current to a solenoid of the fourth control valve 6d, it is possible to control the brake fluid pressure in the driving fluid pressure chamber 316 into a desired value, more finely.

In the meantime, at the abnormal state, all the first to fifth control valves 6a to 6e are positioned as shown. Accordingly, the reaction force chamber 303 and the driving fluid pressure chamber 316 communicate with each other through the pipe path A2, i.e., through the fifth control valve 6e under communication state. Hence, when the brake pedal 2 is stepped, the brake fluid is moved from the reaction force chamber 303 to the driving fluid pressure chamber 316 through the corresponding path, so that it is possible to generate the M/C pressure by the brake fluid pressure in the driving fluid pressure chamber 316. Thereby, it is possible to realize the same effects as the first exemplary embodiment.

Although it has been described that the M/C 3 of the first exemplary embodiment is provided with the accumulator 14 and the fifth control valve 6e, the M/C 3 of the second exemplary embodiment may be provided with the accumulator 14 and the fifth control valve 6e.

Fifth Exemplary Embodiment

A fifth exemplary embodiment is described. In this exemplary embodiment, the pedal reaction force is generated by the stroke simulator regarding the fourth exemplary embodiment. Since the others are the same as the fourth exemplary embodiment, only the parts different from the fourth exemplary embodiment are described.

Figure 6:
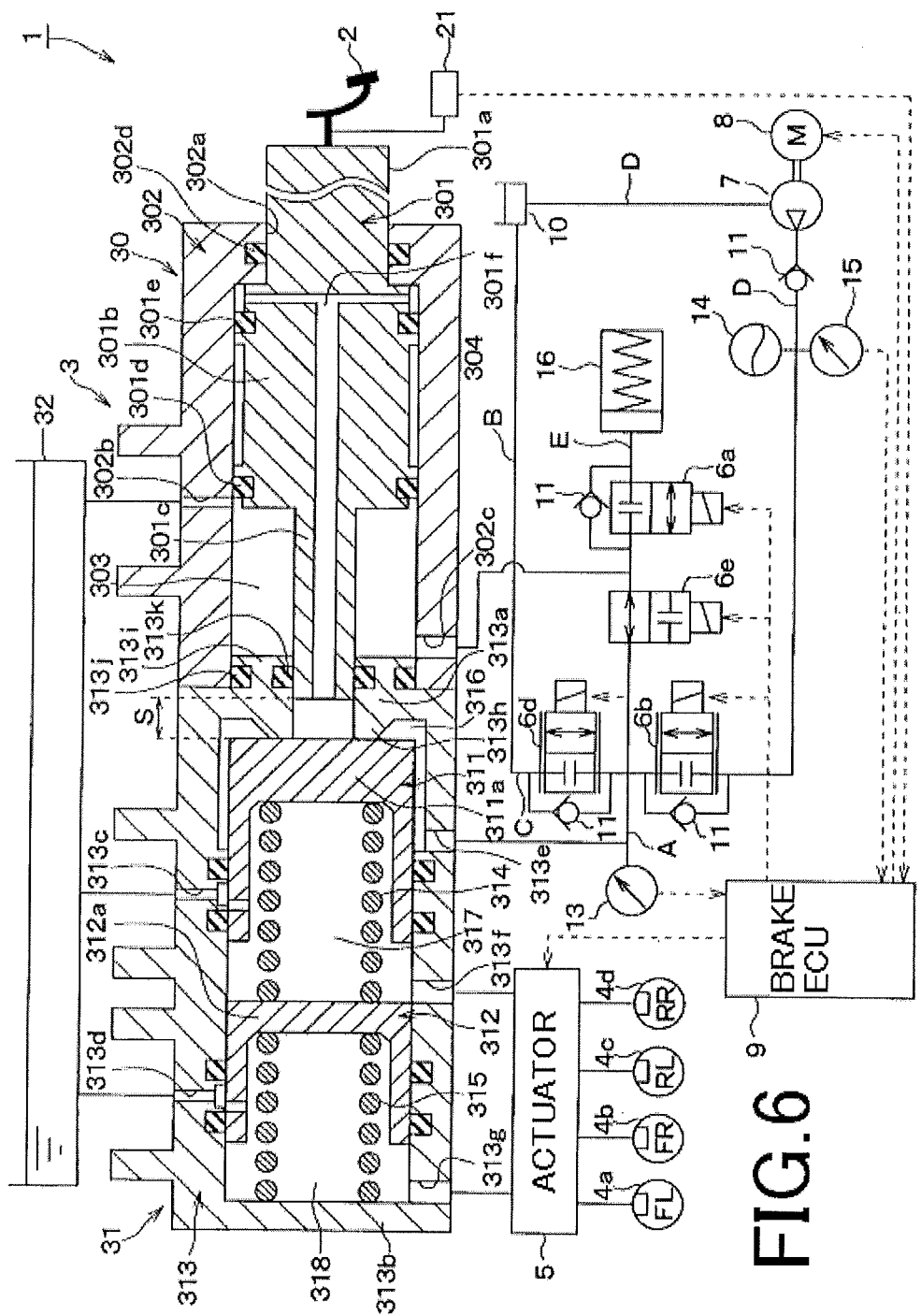
FIG. 6 is a circuit diagram showing an overall configuration of a brake apparatus 1 for a vehicle according to a fifth exemplary embodiment.

FIG. 6 shows an overall configuration of the brake apparatus 1 for a vehicle according to this exemplary embodiment. As shown in FIG. 6, in this exemplary embodiment, the third control valve 6c, which configures a part of the reaction force generator provided in the fourth exemplary embodiment, is omitted and the reaction force generator is configured by the first control valve 6a and the stroke simulator 16. In this case, the pipe path A is a path passing through the fifth control valve 6e and the second control valve 6b is disposed in the pipe path D connected to the pipe path A.

Also in the brake apparatus 1 having the above configuration, at the normal state, the fifth control valve 6e is switched into the closed state, so that even when the input piston 301 is moved as the brake pedal 2 is stepped, the M/C pistons 311, 312 are not moved. At the same time, the first control valve 6a is switched into the communication state by applying the current, so that the reaction force chamber 303 is made to communicate with the stroke simulator 16. Thereby, it is possible to make the reaction force fluid pressure, which will be generated in the reaction force chamber 303, with the pressure set by the stroke simulator 16, so that it is possible to apply the pedal reaction force to the brake pedal 2 in accordance to the operating amount thereof.

After that, when the operating amount of the brake pedal 2 is increased and thus reaches the maximum amount that can be generated as the regenerative brake, the same operation as the fourth exemplary embodiment is made, so that the second control valve 6b becomes under differential pressure state and thus the brake fluid pressure is also generated in the driving fluid pressure chamber 316. Also, at the same time, the fourth control valve 6d is also switched into the differential pressure state. Thereby, it is possible to control the brake fluid pressure in the driving fluid pressure chamber 316 into a desired value.

In the meantime, at the abnormal state, all the first, second, fourth and fifth control valves 6a, 6b, 6d, 6e are positioned as shown. Accordingly, the reaction force chamber 303 and the driving fluid pressure chamber 316 communicate with each other through the pipe path A, i.e., through the fifth control valve 6e under communication state. Hence, like the fourth exemplary embodiment, when the brake pedal 2 is stepped, the brake fluid is moved from the reaction force chamber 303 to the driving fluid pressure chamber 316 through the corresponding path A, so that it is possible to generate the M/C pressure by the brake fluid pressure in the driving fluid pressure chamber 316.

Accordingly, it is possible to generate the reaction force fluid pressure by the stroke simulator 16 in accordance with the operating amount of the brake pedal 2. Even with this configuration, it is possible to realize the same effects as the first exemplary embodiment.

Other Exemplary Embodiments

In the third to fifth exemplary embodiments, the configuration of the fluid pressure circuit, which is provided between the reaction force chamber 303 and the driving fluid pressure chamber 316 in the third to fifth exemplary embodiments, is applied to the M/C 3 having the structure of the first exemplary embodiment. However, the same configuration can be applied to the M/C 3 having the structure of the second exemplary embodiment.

In the above exemplary embodiments, the atmosphere reservoir 10 is separately configured from the master reservoir 32. However, the master reservoir 32 may be used as the atmosphere reservoir 10.

In the above exemplary embodiments, the various paths are configured by the pipe paths A to E provided to the fluid pressure circuit. Specifically, among the pipe paths A to E, the part connecting between the reaction force chamber 303 and the driving fluid pressure chamber 316 corresponds to the brake fluid path, the part connecting between the pump 7 and the driving fluid pressure chamber 316 corresponds to the pump-driving fluid pressure chamber path, the part connecting between the driving fluid pressure chamber 316 and the atmosphere reservoir 10 corresponds to the driving fluid pressure chamber-reservoir path, the part connecting between the pump 7 and the reaction force chamber 303 corresponds to the pump-reaction force chamber path, the part connecting between the reaction force chamber 303 and the atmosphere reservoir 10 corresponds to the reaction force chamber-reservoir path, the part branched from the accumulator 14 and connected to each of the driving fluid pressure chamber 316 and the reaction force chamber 303 corresponds to the accumulator fluid pressure path and the part connecting between the reaction force chamber 303 and the stroke simulator 16 corresponds to the reaction force chamber-simulator path.

According to a first aspect of the disclosure, a brake apparatus includes:

a master cylinder that forms a driving fluid pressure chamber 316, which drives master pistons 311, 312 as brake fluid is supplied thereto and discharged therefrom;

an electrically-operated pressure adjusting part 6b, 6d, 7, 8 configured to supply the brake fluid into the driving fluid pressure chamber 316 or discharges the brake fluid in the driving fluid pressure chamber 316, thereby adjusting a driving fluid pressure of the driving fluid pressure chamber 316;

a reaction force generator that forms a reaction force chamber 303, which is compressed or expanded as a brake operation member 2 is operated, and that is configured to generate a reaction force fluid pressure in the reaction force chamber 303 in accordance with an operating amount of the brake operation member 2;

a brake fluid path, which connects the reaction force chamber 303 to the driving fluid pressure chamber 316, and a valve device 6a, 6d, 6e configured to block, at a current-on state, the brake fluid path between the reaction force chamber 303 and the driving fluid pressure chamber 316 to block flowing of the brake fluid, and that communicates, at a current-off state, the reaction force chamber 303 to the driving fluid pressure chamber 316 through the brake fluid path to enable the flowing of the brake fluid.

According to the above brake apparatus, when executing the regenerative coordination control at the normal state, the brake fluid path A is closed by the valve device 6a, 6b, 6c. Hence, the M/C pressure is not generated until maximum regenerative brake, which can be generated, is generated, so that it is possible to obtain the maximum regenerative efficiency. Also, when a power supply failure occurs, the brake fluid path A becomes under communication state by the valve device 6a, 6b, 6c. Hence, the brake fluid in the reaction force chamber 303 is moved to the driving fluid pressure chamber 316 through the brake fluid path A, so that it is possible to generate the braking force in accordance with the operating amount of the brake operation member, without the invalid stroke. Accordingly, it is possible to remove the invalid stroke when the power supply failure occurs, while securing the regenerative efficiency.

According to a second aspect of the disclosure, the electrically-operated pressure adjusting part includes:

a pump 7;

a first pressure adjusting control valve 6b that is provided on a pump-driving fluid pressure chamber path connecting the pump 7 to the driving fluid pressure chamber 316 and controls inflow of the brake pressure pressurized by the pump 7 into the driving fluid pressure chamber 316; and a second pressure adjusting control valve 6d that is provided on a driving fluid pressure chamber-reservoir path connecting the driving fluid pressure chamber 316 to an atmosphere reservoir 10 and controls outflow of the brake fluid from the driving fluid pressure chamber 316 to the atmosphere reservoir 10, the reaction force generator includes a first reaction force control valve 6a that is provided on a pump-reaction force chamber path connecting the pump 7 to the reaction force chamber 303 and controls inflow of the brake fluid pressurized by the pump 7 into the reaction force chamber 303, and a second reaction force control valve 6c that is provided on a reaction force chamber-reservoir path connecting the reaction force chamber 303 to the atmosphere reservoir 10 and controls outflow of the brake fluid pressurized from the reaction force chamber 303 to the atmosphere reservoir 10, the first pressure adjusting control valve 6b and the first reaction force control valve 6a are normally-opened type control valves, the second pressure adjusting control valve 6d and the second reaction force control valve 6c are normally-closed type control valves, the brake fluid path includes the pump-driving fluid pressure chamber path and the pump-reaction force chamber path, and the valve device includes the first pressure adjusting control valve 6b and the first reaction force control valve 6a.

Accordingly, the brake fluid path is configured by the brake fluid path configuring the electrically-operated pressure adjusting part and the valve device is configured by the control valves configuring the electrically-operated pressure adjusting part, i.e., the brake fluid pressure path and the control valves are made to be respectively common to the electrically-operated pressure adjusting part, the brake fluid path and the valve device, so that it is possible to miniaturize the brake apparatus and to reduce the cost thereof.

According to a third aspect of the disclosure, the electrically-operated pressure adjusting part includes:

an accumulator 14 that accumulates the brake fluid pneumatically transported by a pump 7;

a first pressure adjusting control valve 6b that is branched from the accumulator 14, is provided on a part, of an accumulator fluid pressure path connected to each of the driving fluid pressure chamber 316 and the reaction force chamber 303, between a bifurcation of the accumulator fluid pressure path and the driving fluid pressure chamber 316 and controls inflow of the brake fluid in the accumulator 14 into the driving fluid pressure chamber 316; and a second pressure adjusting control valve 6d that is provided on a driving fluid pressure chamber-reservoir path connecting the driving fluid pressure chamber 316 and an atmosphere reservoir 10 therebetween and controls outflow of the brake fluid from the driving fluid pressure chamber 316 to the atmosphere reservoir 10, the reaction force generator includes:

a first reaction force control valve 6a that is provided on a part of the accumulator fluid pressure path between a bifurcation of the accumulator fluid pressure path and the reaction force chamber 303 and controls inflow of the brake fluid in the accumulator 14 into the reaction force chamber 303; and a second reaction force control valve 6c that is provided on a reaction force chamber-reservoir path connecting the reaction force chamber 303 to the atmosphere reservoir 10 and controls outflow of the brake fluid from the reaction force chamber 303 to the atmosphere reservoir 10, the first pressure adjusting control valve 6b and the first reaction force control valve 6a are normally-opened type control valves, the second pressure adjusting control valve 6d and the second reaction force control valve 6c are normally-closed type control valves, the brake fluid path includes the accumulator fluid pressure path, and the valve device includes a normally-closed control valve 6e that is provided on a part of the accumulator fluid pressure path between the accumulator 14 and a bifurcation of the accumulator fluid pressure path, in addition to the first pressure adjusting control valve 6b and the first reaction force control valve 6a.

Accordingly, the accumulator 14 and the normally-closed type control valve 6e are provided, so that it is possible to introduce the accumulator pressure, which has been already under high pressure, into the reaction force chamber 303 and to thus generate the reaction force fluid pressure with good responsiveness.

In this case, the first pressure adjusting control valve 6b and the first reaction force control valve 6a are the normally-opened type control valves and the second pressure adjusting control valve 6d and the second reaction force control valve 6c are the normally-closed type control valves. Preferably, the brake fluid path A is configured to include the accumulator fluid pressure path and the valve device is configured to include the normally-closed type control valve 6e provided on a part of the accumulator fluid pressure path between the accumulator 14 and the bifurcation of the accumulator fluid pressure path, in addition to the first pressure adjusting control valve 6b and the first reaction force control valve 6a.

Accordingly, the brake fluid path is configured by the brake fluid path configuring the electrically-operated pressure adjusting part and the valve device is configured by the control valves configuring the electrically-operated pressure adjusting part, i.e., the brake fluid pressure path and the control valves are made to be respectively common to the electrically-operated pressure adjusting part, the brake fluid path and the valve device, so that it is possible to miniaturize the brake apparatus and to reduce the cost thereof.

According to a fourth aspect of the disclosure, the reaction force generator has a stroke simulator 16 and a reaction force chamber-simulator path connecting the reaction force chamber 303 to the stroke simulator 16, the brake fluid path comprises the reaction force chamber-simulator path and a simulator-driving fluid pressure chamber path connecting the reaction force chamber-simulator path to the driving fluid pressure chamber 316, and the valve device includes a normally-opened type control valve 6e that is provided on the simulator-driving fluid pressure chamber path and a normally-closed type control valve 6a that is provided to a part of the reaction force chamber-simulator path from the stroke simulator 16 to a connection point to the reaction force chamber-simulator path.

Accordingly, the stroke simulator 16 is provided, so that it is possible to generate the reaction force fluid pressure in accordance with the operating amount of the brake operation member 2.

In this case, preferably, the brake fluid path A is configured to include the reaction force chamber-simulator path and the simulator-driving fluid pressure chamber path connecting the reaction force chamber-simulator path and the driving fluid pressure chamber 316 therebetween and the valve device is configured to include the normally-opened type control valve 6e provided on the simulator-driving fluid pressure chamber path and the normally-closed type control valve 6a provided to a part of the reaction force chamber-simulator path from the stroke simulator 16 to a connection point to the reaction force chamber-simulator path.

Accordingly, the brake fluid path is configured by the brake fluid path configuring the electrically-operated pressure adjusting part, i.e., the brake fluid pressure path is made to be common to the electrically-operated pressure adjusting part and the brake fluid path, so that it is possible to miniaturize the brake apparatus and to reduce the cost thereof.

What is claimed is:

1. A brake apparatus comprising:
    a master cylinder that forms a driving fluid pressure chamber, which drives at least one master piston as brake fluid is supplied thereto and discharged therefrom;
    an electrically-operated pressure adjusting part configured to supply the brake fluid into the driving fluid pressure chamber or discharge the brake fluid in the driving fluid pressure chamber, thereby adjusting a driving fluid pressure of the driving fluid pressure chamber;
    a reaction force generator that forms a reaction force chamber, which is compressed or expanded as a brake operation member is operated, and that is configured to generate a reaction force fluid pressure in the reaction force chamber in accordance with an operating amount of the brake operation member;
    a brake fluid path, which connects the reaction force chamber to the driving fluid pressure chamber, and
    a valve device configured to block, at a current-on state, the brake fluid path between the reaction force chamber and the driving fluid pressure chamber to block flowing of the brake fluid, and to communicate, at a current-off state, the reaction force chamber to the driving fluid pressure chamber through the brake fluid path to enable the flowing of the brake fluid,
    wherein, when the brake apparatus is in a power supply failure state and the brake operation member is operated, the brake fluid in the reaction force chamber is introduced into the driving fluid pressure chamber so that a master cylinder pressure is generated at the master cylinder.

2. The brake apparatus according to claim 1, wherein the electrically-operated pressure adjusting part includes:
    a pump;
    a first pressure adjusting control valve that is provided on a pump-driving fluid pressure chamber path connecting the pump to the driving fluid pressure chamber and controls inflow of the brake pressure pressurized by the pump into the driving fluid pressure chamber; and
    a second pressure adjusting control valve that is provided on a driving fluid pressure chamber-reservoir path connecting the driving fluid pressure chamber to an atmosphere reservoir and controls outflow of the brake fluid from the driving fluid pressure chamber to the atmosphere reservoir,
    the reaction force generator includes a first reaction force control valve that is provided on a pump-reaction force chamber path connecting the pump to the reaction force chamber and controls inflow of the brake fluid pressurized by the pump into the reaction force chamber, and a second reaction force control valve that is provided on a reaction force chamber-reservoir path connecting the reaction force chamber to the atmosphere reservoir and controls outflow of the brake fluid pressurized from the reaction force chamber to the atmosphere reservoir,
    the first pressure adjusting control valve and the first reaction force control valve are normally-opened type control valves,
    the second pressure adjusting control valve and the second reaction force control valve are normally-closed type control valves,
    the brake fluid path includes the pump-driving fluid pressure chamber path and the pump-reaction force chamber path, and
    the valve device includes the first pressure adjusting control valve and the first reaction force control valve.

3. The brake apparatus according to claim 1, wherein the electrically-operated pressure adjusting part includes:
    an accumulator that accumulates the brake fluid pneumatically transported by a pump;
    a first pressure adjusting control valve that is branched from the accumulator, is provided on a part, of an accumulator fluid pressure path connected to each of the driving fluid pressure chamber and the reaction force chamber, between a bifurcation of the accumulator fluid pressure path and the driving fluid pressure chamber and controls inflow of the brake fluid in the accumulator into the driving fluid pressure chamber; and a second pressure adjusting control valve that is provided on a driving fluid pressure chamber-reservoir path connecting the driving fluid pressure chamber and an atmosphere reservoir therebetween and controls outflow of the brake fluid from the driving fluid pressure chamber to the atmosphere reservoir, the reaction force generator includes:

a first reaction force control valve that is provided on a part of the accumulator fluid pressure path between a bifurcation of the accumulator fluid pressure path and the reaction force chamber and controls inflow of the brake fluid in the accumulator into the reaction force chamber; and a second reaction force control valve that is provided on a reaction force chamber-reservoir path connecting the reaction force chamber to the atmosphere reservoir and controls outflow of the brake fluid from the reaction force chamber to the atmosphere reservoir, the first pressure adjusting control valve and the first reaction force control valve are normally-opened type control valves, the second pressure adjusting control valve and the second reaction force control valve are normally-closed type control valves, the brake fluid path includes the accumulator fluid pressure path, and the valve device includes a normally-closed control valve that is provided on a part of the accumulator fluid pressure path between the accumulator and a bifurcation of the accumulator fluid pressure path, in addition to the first pressure adjusting control valve and the first reaction force control valve.

4. The brake apparatus according to claim 1, wherein the reaction force generator includes a stroke simulator and a reaction force chamber-simulator path connecting the reaction force chamber to the stroke simulator, the brake fluid path includes the reaction force chamber-simulator path and a simulator-driving fluid pressure chamber path connecting the reaction force chamber-simulator path to the driving fluid pressure chamber, and the valve device includes a normally-opened type control valve that is provided on the simulator-driving fluid pressure chamber path and a normally-closed type control valve that is provided to a part of the reaction force chamber-simulator path from the stroke simulator to a connection point to the simulator-driving fluid pressure chamber path.

* * * * *